Oct. 27, 1970  M. FAULSTICH ET AL  3,536,504
OPTICAL GLASSES
Filed Aug. 31, 1966
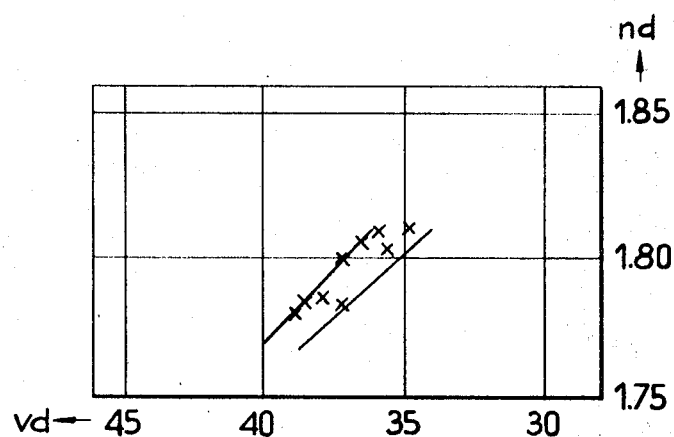
INVENTORS:
Marga Faulstich and Willy Ritze
By: Burgess, Ruthledge & Genny
      Attorneys

United States Patent Office 3,536,504
Patented Oct. 27, 1970

3,536,504
OPTICAL GLASSES
Marga Faulstich, Mainz, and Willy Ritze, Mainz-Mombach, Germany, assignors to Jenaer Glaswerk Schott & Gen., Mainz, Germany, a corporation of Germany
Filed Aug. 31, 1966, Ser. No. 576,350
Claims priority, application Germany, Sept. 4, 1965,
J 28,925
Int. Cl. C03c 10
U.S. Cl. 106—54                                11 Claims

ABSTRACT OF THE DISCLOSURE

An optical glass having an index of refraction of about 1.77 to 1.81 and an Abbé value of about 34 to 40 having the following composition:

|  | Wt. percent |
|---|---|
| $SiO_2$ | 15–20 |
| $B_2O_3$ | 8–10 |
| BaO | 27–37 |
| CaO+SrO | 0–3 |
| $La_2O_3$ | 15–24 |
| $ZrO_2$ | 3.5–5.5 |
| $TiO_2$ | 6–13 |
| $Ta_2O_5$ | 5–7 |
| $ZrO_2+TiO_2+Ta_2O_5$ | 15–23 |
| CdO and/or PbO and/or $Bi_2O_3$ and/or $WO_3$ | 0.5–4.5 |
| $As_2O_3$ | 0.5–1.5 |

---

This invention relates to a novel class of optical glasses, and more particularly refers to such glasses which are stable against devitrification and are otherwise an improvement over glasses provided by the prior art.

It is known to produce optical glasses having various indices of refraction and Abbé values. It is further known to produce glasses having as the upper value of their refractive indices and Abbé values:

$$n_d 1.77 \ v_d = 40 \text{ to } n_d 1.81 \ v_d = 36$$

$$n_d 1.77 \ v_d = 37 \text{ to } n_d 1.81 \ v_d = 34$$

In the prior art, glasses having the above optical properties can be categorized as follows:

(a) Cadmium Lanthanum Borate Glasses in which the CdO content amounts to 12 to 80 weight percent and the $La_2O_3$ content amounts to a maximum of 45 weight percent, and which are stabilized against devitrification either with $ThO_2$ or with $TiO_2+WO_3$. Those stabilized with $TiO_2+WO_3$ can be melted in units of up to 10 kg. without devitrifying.

(b) Lead Borates wherein the PbO content is greater than 18 weight percent.

(c) Lead Phosphates with 80 to 90 weight percent $Pb_3(PO_4)$.

(d) Barium Lead Borates in which the BaO content is greater than 50 weight percent and the PbO content amounts to at least 5 weight percent.

(e) Lanthanum Borates in which the $La_2O_3$ content is greater than 50 weight percent and which are stabilized against devitrification with 5 to 25 weight percent $TiO_2$ plus 10 weight percent $Ta_2O_5$ and/or 5 weight percent $Nb_2O_5$ and $WO_3$.

(f) Thoric Lanthanum-Alkaline Earth-Titanium Borates in which the $ThO_2+TiO_2$ content amounts to between 12 and 18 weight percent and the $ThO_2$ content must be greater than 5 weight percent.

(g) Rare Earth Borates wherein the following condition must be fulfilled: The sum of the oxides of Ti, La, Ytt, Nb, Ta, W, and Th is greater than 50 weight percent.

While all of these prior art glasses have optical properties within the range which is considered to be desirable for use in this invention, these prior art glasses have certain disadvantages. For example, the cadmium lanthanum borate glasses, the lead phosphate glasses and the barium lead borate glasses contain high lead oxide and cadmium oxide contents, which oxides tend to be reduced during the bonding of these glasses. Further, these oxides or their reduced moieties tend to vaporize during bonding, and the metals of these oxides have the tendency to provoke poisoning in sensitive cathode coatings.

The lanthanum borate glasses, thoric lanthanum-alkaline earth-titanium borate glasses and rare earth borate glasses have rather poor resistance to devitrification. The high rare earth oxide glasses do not attain sufficiently high coefficients of expansion. The glasses stabilized with greater than 5 weight percent thorium oxide are somewhat less than desirable because of the radioactivity of thorium.

It is an object of this invention to provide novel glass compositions which are not subject to the disadvantages of prior art glasses.

It is another object of this invention to provide novel glass compositions having optical properties within the scope of those set forth above which do not have the deficiencies of prior art glasses.

It is a further object of this invention to provide novel glass compositions which are devitrification-resistant and have high chemical resistance.

It is still a further object of this invention to provide novel glass compositions which are suitable for formation via continuous or automatic means into blocks, bars, long, round rods, parisons and gobs without devitrification.

Other and additional objects of this invention will become apparent from a consideration of this entire specification, including the claims appended hereto.

In accord with and fulfilling these objects, this invention envisions, in one of its aspects, the production of glasses having a linear coefficient of expansion in the range of about 25 to 420° C. of about 84 to $92 \times 10^{-7}$. The pure transmittancy of these glasses ($R\tau$) is at least about 80 percent where $\lambda$ equals 420 nm. for a glass having a thickness of about 10 mm. Glasses according to this invention have high chemical resistance and, in fact, are in Class 0 insofar as their sensitivity of spotting is concerned, and further, they are extremely resistant to atmospheric change as shown by their classification in Class 1 with respect to this property.

The glasses of this invention have the following compositions wherein proportions are expressed in weight percent:

| | |
|---|---|
| $SiO_2$ | 15 to 20 |
| $B_2O_3$ | 8 to 10 |
| $La_2O_3$ | 15 to 24 |
| BaO | 27 to 37 |
| $ZrO_2$ | 3.5 to 5.5 |
| $TiO_2$ | 6 to 13 |
| $Ta_2O_5$ | 5 to 7 |
| ($ZrO_2$, $TiO_2$ and $Ta_2O_5$) | 15 to 23 |
| CdO and/or PbO and/or $Bi_2O_3$ and/or $WO_3$ | 0.5 to 4.5 |

The cadmium oxide can be about 0 to 2 wt. percent, the lead oxide can be about 0 to 2 wt. percent, the bismuth oxide can be about 0 to 1 wt. percent and the tungsten oxide can be about 0 to 3 wt. percent with the provision that the total of said oxides is 0.5 to 4.5%.

In order to prevent the reduction of these oxides during the use of the glasses of this invention in a bonding process, it is desirable that the cadmium oxide content be maintained less than about 2.5 weight percent, the lead oxide and bismuth oxide contents each be maintained less than about 1 weight percent and the tungsten oxide content be maintained less than about 2.5 weight percent.

In order to maintain the tendency of the glass of this invention not to devitrify, it is desirable to maintain the alkali metal oxide content of glasses of this invention less than about 1 percent and preferably less than about ½ percent measured as lithium oxide.

It is within the scope of this invention to add up to about ½ percent aluminum oxide to the glass composition herein. It is further within the scope of this invention to replace a portion of the lanthanum oxide content of the instant glasses with thorium oxide, should the glasses of this invention not be intended for use under circumstances where radioactivity is a detrimental property.

The glasses of this invention are prepared by carefully measuring each required metal oxide; mixing such metal oxide as for example in a commercial batch mixer for 5 minutes; passing the mixed batch in a platinum crucible for about 6 hours at about 1240 to 1280° C.; and then firing the batch at about 1370° C. to 1400° C. for about 3 hours. The melt is stirred for about 90 minutes during which time it is permitted to cool to a temperature of about 1045° C., whereupon the prepared glass can be cast into a preheated mold or worked into parisons or gobs by automatic procedure, as is the usual practice in the glass industry. The glass is cooled in an oven from about 667° C. to room temperature at a conventional cooling rate of about 620° C. to 0.5° C. per hour.

Understanding of this invention will be facilitated by reference to the accompanying drawing which is a graphical representation of the physical properties of various glasses made according to this invention. In this drawing, the arrows indicate the area in which devitrification resistant glasses can be made. The X's indicate various compositions within the scope of this invention which are similarly devitrification-resistant.

The following examples are given by way of illustration of this invention only, and should not be construed as being limiting upon the scope thereof. All parts and percentages are by weight, unless specified to the contrary.

EXAMPLE I

In a specific example of the practice of this invention, a glass having a refraction index of about 1.8040 and an Abbé value of 36.4 was prepared by mixing the following materials in the indicated amounts:

|  | G. |
|---|---|
| Silicic acid ($SiO_2$) | 6,733 |
| Boric acid ($H_3BO_3$) | 5,810 |
| Barium carbonate ($BaCO_3$) | 15,117 |
| Zinc oxide (ZnO) | 121 |
| Cadmium oxide (CdO) | 682 |
| Lead oxide ($Pb_3O_4$) | 533 |
| Lanthanum oxide ($La_2O_3$) | 8,586 |
| Titanium oxide ($TiO_2$) | 3,330 |
| Zirconium oxide ($ZrO_2$) | 1,966 |
| Tantalum oxide ($Ta_2O_5$) | 2,327 |
| Tungsten oxide ($WO_3$) | 482 |
| Arsenic oxide ($As_2O_3$) | 405 |

A seven-liter melt of glass having the following components and proportions was prepared from these raw materials by the process described above:

| | |
|---|---|
| $SiO_2$ | 16.8 |
| $B_2O_3$ | 8.2 |
| BaO | 29.1 |
| ZnO | 0.3 |
| CdO | 1.7 |
| PbO | 1.3 |
| $La_2O_3$ | 21.4 |
| $TiO_2$ | 8.3 |
| $ZrO_2$ | 4.9 |
| $Ta_2O_5$ | 5.8 |
| $WO_3$ | 1.2 |
| $As_2O_3$ | 1.0 |

In a similar manner, the following compositions and preparations set forth in the table below have been formulated as optical glasses having the indices of refraction and Abbé values also indicated in the table.

TABLE

| Oxide | Example No. | | | | | | |
|---|---|---|---|---|---|---|---|
| | 2 | 3 | 4 | 5 | 6 | 7 | 8 |
| $SiO_2$ | 19.5 | 15.6 | 16.8 | 15.8 | 15.7 | 18.1 | 17.3 |
| $B_2O_3$ | 9.4 | 8.0 | 8.2 | 8.2 | 8.2 | 9.1 | 8.4 |
| $Li_2O$ | | 0.5 | | | 0.3 | | |
| $Na_2O$ | | 0.5 | | | | | |
| ($K_2O$) | | | | | | | |
| CaO | 2.6 | | | | | 2.6 | |
| BaO | 28.8 | 36.7 | 29.0 | 34.1 | 34.6 | 27.8 | 32.2 |
| CdO | | | 1.7 | 0.5 | 0.3 | | 0.6 |
| ZnO | 0.1 | | 0.3 | | | | 0.5 |
| PbO | | | 1.5 | | | | 1.0 |
| $La_2O_3$ | 17.9 | 20.7 | 21.3 | 20.4 | 20.4 | 17.9 | 17.3 |
| $Bi_2O_3$ | | | | | | | 0.6 |
| $ZrO_2$ | 3.8 | 5.0 | 4.9 | 4.9 | 4.8 | 3.6 | 5.0 |
| $TiO_2$ | 9.7 | 7.5 | 8.3 | 10.0 | 10.0 | 12.8 | 10.3 |
| $Ta_2O_5$ | 6.6 | 5.0 | 5.8 | 5.1 | 5.1 | 6.6 | 5.2 |
| $WO_3$ | 0.6 | | 1.2 | | 0.3 | 0.6 | 0.6 |
| $As_2O_3$ | 1.0 | 0.5 | 1.0 | 1.0 | 0.3 | 1.0 | 1.0 |
| $n_d$ | 1.781 | 1.785 | 1.804 | 1.807 | 1.808 | 1.809 | 1.812 |
| $v_d$ | 37.2 | 38.3 | 36.4 | 36.0 | 35.9 | 34.2 | 35.1 |

What is claimed is:
1. Optical glass having an index of refraction of about 1.77 to 1.81 and an Abbé value of about 34 to 40 having the following composition:

| | Wt. percent |
|---|---|
| $SiO_2$ | 15–20 |
| $B_2O_3$ | 8–10 |
| BaO | 27–37 |
| CaO+SrO | 0–3 |
| $La_2O_3$ | 15–24 |
| $ZrO_2$ | 3.5–5.5 |
| $TiO_2$ | 6–13 |
| $Ta_2O_5$ | 5–7 |
| $ZrO_2+TiO_2+Ta_2O_5$ | 15–23 |
| CdO and/or PbO and/or $Bi_2O_3$ and/or $WO_3$ | 0.5–4.5 |
| $As_2O_3$ | 0.5–1.5 |

2. Optical glass as claimed in claim 1, wherein said cadmium oxide is present in a proportion of about 0 to 2 weight percent, said lead oxide is present in a proportion of about 0 to 2 weight percent, said bismuth oxide is present in a proportion of about 0 to 1 weight percent, and said tungsten oxide is present in a proportion of about 0 to 3 percent.

3. Optical glass as claimed in claim 1, wherein up to about 3 percent of said barium oxide is replaced by zinc oxide.

4. Optical glass as claimed in claim 1, having an index of refraction of 1.8040 and an Abbé value of 36.4, which has the following composition:

| | |
|---|---|
| $SiO_2$ | 16.8 |
| $B_2O_3$ | 8.2 |
| BaO | 29.0 |
| ZnO | 0.3 |
| CdO | 1.7 |
| PbO | 1.5 |
| $La_2O_3$ | 21.3 |
| $TiO_2$ | 8.3 |
| $ZrO_2$ | 4.9 |
| $Ta_2O_5$ | 5.8 |
| $WO_3$ | 1.2 |
| $As_2O_3$ | 1.0 |

5. Optical glass as claimed in claim 1, having an index of refraction of 1.781 and an Abbé value of 37.2, which has the following composition:

| | |
|---|---|
| $SiO_2$ | 19.5 |
| $B_2O_3$ | 9.4 |
| CaO | 2.6 |
| BaO | 28.8 |
| ZnO | 0.1 |
| $La_2O_3$ | 17.9 |
| $ZrO_2$ | 3.8 |
| $TiO_2$ | 9.7 |
| $Ta_2O_5$ | 6.6 |
| $WO_3$ | 0.6 |
| $As_2O_3$ | 1.0 |

6. Optical glass as claimed in claim 1, having an index of refraction of 1.785 and an Abbé value of 38.3, which has the following composition:

| | |
|---|---|
| $SiO_2$ | 15.6 |
| $B_2O_3$ | 8.0 |
| $Li_2O$ | 0.5 |
| $Na_2O$ | 0.5 |
| BaO | 36.7 |
| $La_2O_3$ | 20.7 |
| $ZrO_2$ | 5.0 |
| $TiO_2$ | 7.5 |
| $Ta_2O_5$ | 5.0 |
| $As_2O_3$ | 0.5 |

7. Optical glass as claimed in claim 1, having an index of refraction of 1.804 and an Abbé value of 36.4, which has the following composition:

| | |
|---|---|
| $SiO_2$ | 16.8 |
| $B_2O_3$ | 8.2 |
| BaO | 29.0 |
| CdO | 1.7 |
| ZnO | 0.3 |
| PbO | 1.5 |
| $La_2O_3$ | 21.3 |
| $ZrO_2$ | 4.9 |
| $TiO_2$ | 8.3 |
| $Ta_2O_5$ | 5.8 |
| $WO_3$ | 1.2 |
| $As_2O_3$ | 1.0 |

8. Optical glass as claimed in claim 1, having an index of refraction of 1.807 and an Abbé value of 36.0, which has the following composition:

| | |
|---|---|
| $SiO_2$ | 15.8 |
| $B_2O_3$ | 8.2 |
| BaO | 34.1 |
| CdO | 0.5 |
| $La_2O_3$ | 20.4 |
| $ZrO_2$ | 4.9 |
| $TiO_2$ | 10.0 |
| $Ta_2O_5$ | 5.1 |
| $As_2O_3$ | 1.0 |

9. Optical glass as claimed in claim 1, having an index of refraction of 1.808 and an Abbé value of 35.9, which has the following composition:

| | |
|---|---|
| $SiO_2$ | 15.7 |
| $B_2O_3$ | 8.2 |
| $Li_2O$ | 0.3 |
| BaO | 34.6 |
| CdO | 0.3 |
| $La_2O_3$ | 20.4 |
| $ZrO_2$ | 4.8 |
| $TiO_2$ | 10.0 |
| $Ta_2O_5$ | 5.1 |
| $WO_3$ | 0.3 |
| $As_2O_3$ | 0.3 |

10. Optical glass as claimed in claim 1, having an index of refraction of 1.809 and an Abbé value of 34.2, which has the following composition:

| | |
|---|---|
| $SiO_2$ | 18.1 |
| $B_2O_3$ | 9.1 |
| CaO | 2.6 |
| BaO | 27.8 |
| $La_2O_3$ | 17.9 |
| $ZrO_2$ | 3.6 |
| $TiO_2$ | 12.8 |
| $Ta_2O_5$ | 6.6 |
| $WO_3$ | 0.6 |
| $As_2O_3$ | 1.0 |

11. Optical glass as claimed in claim 1, having an index of refraction of 1.812 and an Abbé value of 35.1, which has the following composition:

| | |
|---|---|
| $SiO_2$ | 17.3 |
| $B_2O_3$ | 8.4 |
| BaO | 32.2 |
| CdO | 0.6 |
| ZnO | 0.5 |
| PbO | 1.0 |
| $La_2O_3$ | 17.3 |
| $Bi_2O_3$ | 0.6 |
| $ZrO_2$ | 5.0 |
| $TiO_2$ | 10.3 |
| $Ta_2O_5$ | 5.2 |
| $WO_3$ | 0.6 |
| $As_2O_3$ | 1.0 |

References Cited

UNITED STATES PATENTS 2,967,779  1/1961  Izumitani _____ 106—54

FOREIGN PATENTS

| 686,708 | 1/1953 | Great Britain. |
|---|---|---|
| 1,188,248 | 3/1965 | Germany. |
| 55,355 | 9/1943 | Netherlands. |
| 1,047,994 | 12/1958 | Germany. |

HELEN M. McCARTHY, Primary Examiner

U.S. Cl. X.R.

106—53